United States Patent [19]

Pujado et al.

[11] Patent Number: 4,568,447
[45] Date of Patent: Feb. 4, 1986

[54] PROCESS FOR THE REMOVAL OF TRACE QUANTITIES OF HYDROCARBONACEOUS COMPOUNDS FROM AN AQUEOUS STREAM

[75] Inventors: Peter R. Pujado, Palatine; John G. Sikonia, La Grange, both of Ill.

[73] Assignee: UOP Inc., Des Plaines, Ill.

[21] Appl. No.: 759,812

[22] Filed: Jul. 29, 1985

[51] Int. Cl.⁴ .................. C10G 45/06; B01D 11/00
[52] U.S. Cl. ........................ 208/177; 208/216 R; 208/211; 210/634; 210/806
[58] Field of Search .......... 208/177, 189, 211, 217, 208/263, 216 R, 291; 210/634, 806

[56] References Cited

U.S. PATENT DOCUMENTS

| | | | |
|---|---|---|---|
| 2,927,075 | 3/1960 | Brown | 210/634 X |
| 3,640,686 | 2/1972 | Famham | 208/211 X |
| 3,892,818 | 7/1975 | Scharfe et al. | 260/676 R |
| 3,903,250 | 9/1975 | Tsutsumishita et al. | 210/634 X |
| 3,919,398 | 11/1975 | Davis | 423/481 |
| 3,940,334 | 2/1976 | Miyazawa | 210/634 |
| 4,123,559 | 10/1978 | Vitzthum et al. | 426/312 |
| 4,162,902 | 7/1979 | Wiesner et al. | 210/634 X |
| 4,290,880 | 9/1981 | Leonard | 208/309 |
| 4,308,200 | 12/1981 | Fremont | 260/110 |
| 4,397,736 | 8/1983 | Low | 208/211 X |
| 4,477,354 | 10/1984 | Fessler | 210/634 |
| 4,518,502 | 5/1985 | Burns et al. | 210/634 |
| 4,522,707 | 6/1985 | Kriegel et al. | 208/180 |

OTHER PUBLICATIONS

"Sour–Water Processing turns Problem into Payout", Annessen and Gould, Chemical Eng. vol. 78, No. 7, Mar. 22, 1971.

*Primary Examiner*—John Doll
*Assistant Examiner*—Glenn A. Caldarola
*Attorney, Agent, or Firm*—Thomas K. McBride; William H. Page, II; John G. Cutts, Jr.

[57] ABSTRACT

A process for the removal of trace quantities of hydrocarbonaceous compounds from an aqueous stream which comprises the steps of: (a) contacting a solvent, which in the supercritical state is effective to dissolve the hydrocarbonaceous compounds from the aqueous stream, with the aqueous stream, for a time sufficient at supercritical solvent conditions to dissolve at least a portion of the hydrocarbonaceous compounds and to produce an aqueous stream having a reduced hydrocarbonaceous compound concentration; (b) separating the hydrocarbonaceous compounds from the solvent at subcritical conditions; and (c) recovering the hydrocarbonaceous compounds.

20 Claims, 1 Drawing Figure

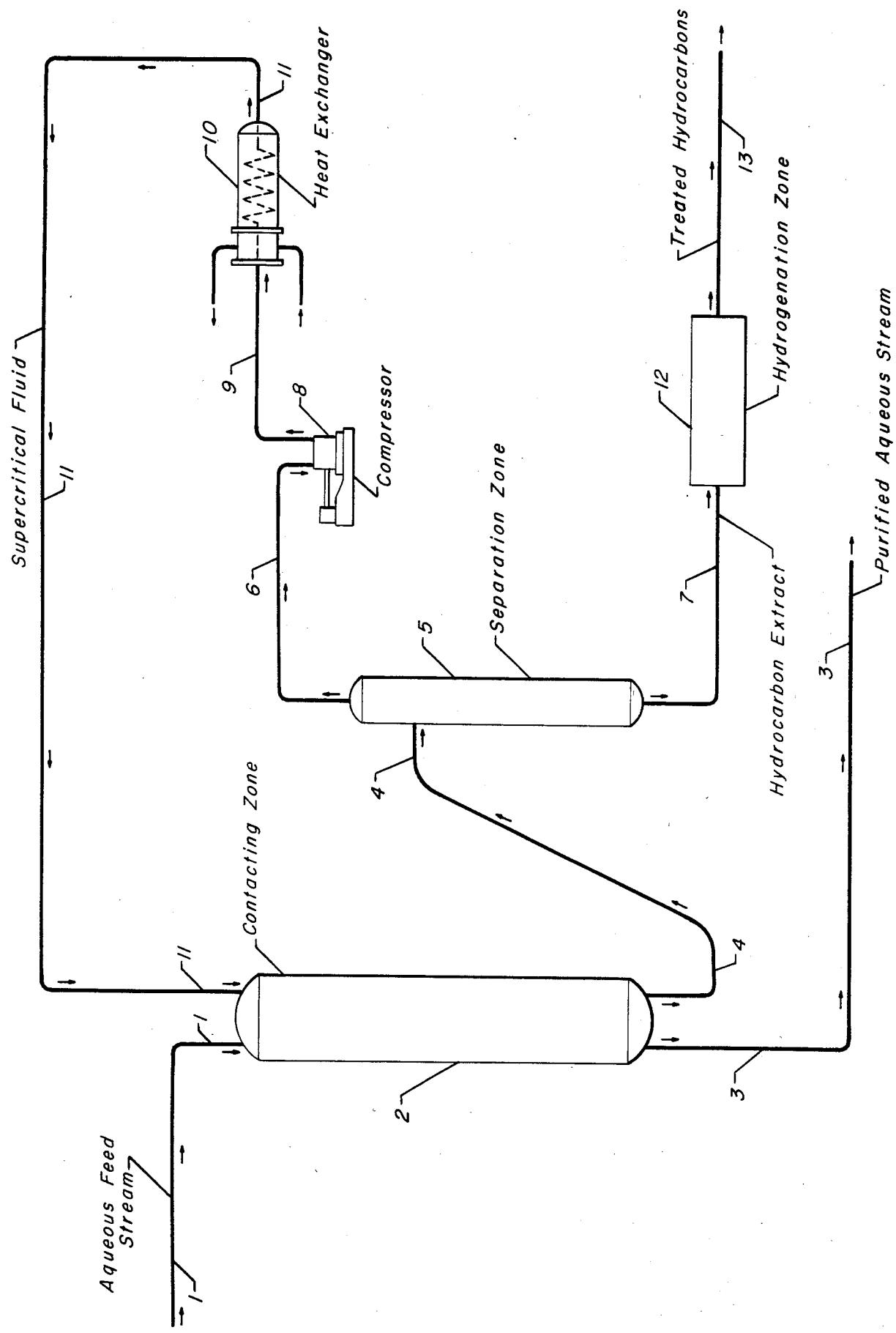

PROCESS FOR THE REMOVAL OF TRACE QUANTITIES OF HYDROCARBONACEOUS COMPOUNDS FROM AN AQUEOUS STREAM

BACKGROUND OF THE INVENTION

The field of art to which this invention pertains is the removal of trace quantities of hydrocarbonaceous compounds from an aqueous stream. More specifically, the invention relates to a process for the removal of trace quantities of hydrocarbonaceous compounds from an aqueous stream which comprises the steps of: (a) contacting a solvent, which in the supercritical state is effective to dissolve the trace hydrocarbonaceous compounds from the aqueous stream, with the aqueous stream, for a time sufficient at supercritical solvent conditions to dissolve at least a portion of the trace hydrocarbonaceous compounds and leave an aqueous stream having a reduced hydrocarbonaceous compound concentration; (b) separating the hydrocarbonaceous compounds from the solvent at subcritical conditions; and (c) recovering the hydrocarbonaceous compounds. In another embodiment of the present invention, the hydrocarbonaceous compounds which are recovered as hereinabove described are hydrotreated to eliminate any obnoxious characteristics of the recovered hydrocarbonaceous compounds.

INFORMATION DISCLOSURE

In U.S. Pat. No. 3,919,398 (Davis), a method is disclosed for recovering bromine as hydrogen bromide from aromatic bromides. The method involves reacting the aromatic bromide with hydrogen at a temperature within the range from about 200° to about 600° C. in the presence of a palladium activated catalyst.

In U.S. Pat. No. 3,892,818 (Scharfe et al.), a method is disclosed for the conversion of hydrocarbon chlorides in the presence of hydrogen to hydrocarbons and hydrogen chloride wherein the process takes place in a gaseous phase and in the presence of rhodium-containing catalyst.

In U.S. Pat. No. 4,522,707 a process is disclosed for regenerating used oils comprising spindle oil, neutral oil, additives, oxidation products, and heavy or nonvolatile hydrocarbons. The '707 patent discloses treating the used oils with a gas which is above its critical pressure and temperature, separating the supercritical gas phase, and separating neutral oil, spindle oil and additives from the gas phase by lowering its pressure and/or temperature or by lowering the pressure and raising the temperature. This patent also teaches that the supercritical gas selectively extracts the useful components at lower temperatures than are used in conventional distillation processes; the gas is reusable and the process can be operated continuously; and the gas is preferably carbon dioxide, propane, ethylene or an ethane/ethylene or propane/propylene mixture.

U.S. Pat. No. 4,308,200 discloses a process for the extraction of coniferous woods, such as pine, with supercritical fluids to recover tall oil and turpentine. The '200 patent also teaches that gases such as carbon dioxide, nitrous oxide, nitrogen and lower alkanes or lower alkenes are contacted with a subdivided wood.

In U.S. Pat. No. 4,123,559, a process is disclosed for the preparation of spice extracts by the extraction of the natural spice with a supercritical gas such as carbon dioxide in which the aroma and flavor contents of the spice are extracted and recovered.

In the hydrocarbon processing art, it is well known to utilize a supercritical fluid to process a heavy residual hydrocarbon in order to produce a deasphalted oil which has a reduced concentration of asphaltenes, metals and resins. For example, U.S. Pat. No. 4,290,880 (Leonard) is representative of the art relating to hydrocarbon processing utilizing supercritical fluids.

BRIEF SUMMARY OF THE INVENTION

The present invention is a process for the removal of trace quantities of hydrocarbonaceous compounds from an aqueous stream utilizing supercritical fluids to preferably produce an essentially hydrocarbon-free aqueous stream.

One embodiment of the present invention relates to a process for the removal of trace quantities of hydrocarbonaceous compounds from an aqueous stream which comprises the steps of: (a) contacting a solvent, which in the supercritical state is effective to dissolve said hydrocarbonaceous compounds from the aqueous stream, with the aqueous stream, for a time sufficient at supercritical solvent conditions to dissolve at least a portion of the hydrocarbonaceous compounds and to produce an aqueous stream having a reduced hydrocarbonaceous compound concentration; (b) separating the hydrocarbonaceous compounds from the solvent at subcritical conditions; and (c) recovering the hydrocarbonaceous compounds.

Another embodiment of the present invention relates to a process for the removal of trace quantities of hydrocarbonaceous compounds having obnoxious characteristics from an aqueous stream which comprises the steps of: (a) contacting a solvent, which in the supercritical state is effective to dissolve said hydrocarbonaceous compounds from the aqueous stream, with the aqueous stream, for a time sufficient at supercritical solvent conditions to dissolve at least a portion of the hydrocarbonaceous compounds and to produce an aqueous stream having a reduced hydrocarbonaceous compound concentration; (b) separating the hydrocarbonaceous compounds from the solvent at subcritical conditions; and (c) hydrotreating the hydrocarbonaceous compounds recovered from step (b) whereby the obnoxious characteristics of the hydrocarbonaceous compounds are reduced.

Other embodiments of the present invention encompass further details such as potential hydrocarbonaceous compound contaminants, supercritical solvents, hydrotreating catalysts, and operating conditions, all of which are hereinafter disclosed in the following discussion of each of these facets of the invention.

BRIEF DESCRIPTION OF THE DRAWING

The drawing is a simplified process flow diagram of a preferred embodiment of the present invention.

DETAILED DESCRIPTION OF THE INVENTION

There is a steadily increasing demand for technology which is capable of eliminating trace quantities of hydrocarbonaceous compounds from aqueous streams. Once an organic phase is decanted from a water phase, the remaining water may potentially contain trace quantities of organic compounds such as hydrocarbonaceous compounds for example. Before waste water can be discharged into the environment, these trace quantities of hydrocarbonaceous compounds must be reduced or eliminated. In the event that these trace hydrocarbonaceous compounds are toxic, carcinogenic or otherwise obnoxious, it is preferred that the hydrocarbonaceous compounds not only be removed from the aqueous phase but converted into less noxious compounds. Therefore, those skilled in the art have sought to find feasible techniques to remove trace amounts of hydrocarbonaceous compounds from an aqueous phase. Although simple in concept, conventional liquid-liquid extraction often is not practical for the removal of hydrocarbonaceous compound contaminants at the parts-per-million level.

The present invention provides an improved process for the removal of trace quantities of hydrocarbonaceous compounds from an aqueous stream. A wide variety of hydrocarbonaceous compounds are to be considered candidates for removal from an aqueous stream in accordance with the process of the present invention. Examples of compounds which are suitable for treatment by the process of the present invention are halogenated hydrocarbons. Certain halogenated hydrocarbons having demonstrated or potential toxicity include but are not limited to kepone, halogenated biphenyls, halogenated cyclodienes, such as aldrin, dieldrin, and hexachlorocyclopentadienes, dibromochloropropane, halogenated phthalic anhydrides, such as polybromophthalicanhydride, tetrachloroethylene, polychlorodioxins such as tetrochlorodibenzodioxin, halogenated organic phosphates such as 2,2 dichlorovinyl-dimethyl phosphate. Additional examples of compounds which are suitable for treatment include organometallic compounds and especially those which contain metals such as lead, mercury, cadmium, cobalt, cadmium, arsenic, vanadium, and chromium. Contaminating hydrocarbonaceous compounds may comprise sulfur, oxygen, metal or nitrogen components. In accordance with the present invention, generally any hydrocarbonaceous compound may be removed from an aqueous stream. It is preferred that the trace quantities of hydrocarbonaceous compounds are present in the aqueous stream in an amount from about 1 to about 10,000 PPM and more preferably in an amount from about 1 to about 5,000 PPM.

One of the critical features of the present invention is the use of a supercritical fluid to extract the trace hydrocarbonaceous compounds from the aqueous stream. The term supercritical fluids is used to describe those fluids which have been compressed beyond their critical pressure and also heated above their critical temperature. Gases are most suitable, and particularly carbon dioxide since it is nonhazardous, nontoxic and relatively inexpensive. Other inorganic gases and organic gases can also be used, for example, nitrogen, nitrous oxide, saturated and unsaturated hydrocarbons containing up to about 5 carbon atoms, saturated and unsaturated halogenated hydrocarbons containing up to about 3 carbon atoms and mixtures thereof. Suitable gases include the lower alkanes such as methane, ethane, propane, butane and lower alkenes such as propylene and the like. Preferred gases possess critical temperatures which are less than about 200° F. This listing is representative only and is not meant to be exhaustive as there are other gases which can also be compressed and heated beyond their critical points to give supercritical fluids which are excellent extractants or solvents. As used herein, the word "fluid" means a supercritical fluid. The hydrocarbonaceous compounds may be separated from the solvent by adjusting the temperature or pressure of the solvent to produce subcritical conditions, thereby effecting the desired separation.

Supercritical with respect to the temperature of carbon dioxide means a temperature above 31.6° C. In practice temperatures as high as 80° C. or more may be used. Supercritical with respect to the pressure of carbon dioxide means a pressure above 1077 psig (74.3 atmospheres absolute). In practice pressures as high as 5865 psig (400 atmospheres absolute) or more may be employed. The corresponding cricital data for other gases utilized in the present invention can be readily determined from the literature.

In accordance with the present invention, the hydrocarbonaceous comtaminants contained in an aqueous stream may be removed by contacting the solvent which is in a supercritical state with the aqueous stream in any suitable and convenient manner. The contacting may be performed in counter-current or cocurrent flow and the contacting zone may be filled with packing, baffles, trays or any other suitable contacting aids. The contacting time is preferably from about 0.1 to about 100 minutes. Of course, it is generally desirable that the most efficient extraction technique be used for the sake of economy. As used herein, the term "essentially hydrocarbon-free" connotes a hydrocarbonaceous compound concentration of less than about 10 PPM.

In another embodiment of the present invention, when the hydrocarbonaceous compounds recovered from the aqueous stream are found to have undesirable characteristics such as for example toxicity or carcinogenicity, they are introduced into a hydrogenation zone wherein such hydrocarbons are converted into less noxious compounds. The recovered hydrocarbonaceous compounds may be directly introduced into the hydrogenation zone or may be admixed with a carrier hydrocarbon such as kerosene or diesel fuel, for example, in order to facilitate the handling of the recovered hydrocarbonaceous compounds. In accordance with this embodiment of the present invention the hydrocarbonaceous extract, with or without a carrier hydrocarbon, is admixed with a hydrogen-rich gaseous phase and introduced into a catalytic hydrogenation zone. The catalytic hydrogenation zone may contain a fixed, ebullated or fluidized catalyst bed. This reaction zone is preferably maintained under an imposed pressure of from about 300 psig to about 2,000 psig and more preferably under a pressure from about 400 psig to about 1800 psig. Suitably, such reaction is conducted with a maximum catalyst bed temperature in the range of about 400° F. to about 850° F. selected to perform the desired conversion to reduce the undesirable characteristics of the feed hydrocarbon. Further operating conditions include liquid hourly space velocities in the range from about 0.2 $hr^{-1}$ to about 10 $hr^{-1}$ and hydrogen circulation rates from about 200 standard cubic feet per barrel to about 10,000 standard cubic feet per barrel, preferably from about 300 standard cubic feet per barrel to about 8,000 standard cubic feet per barrel.

The preferred catalytic composite disposed within the hereinabove described hydrogenation zone can be characterized as containing a metallic component having hydrogenation activity, which component is combined with a suitable refractory inorganic oxide carrier material of either synthetic or natural origin. The precise composition and method of manufacturing the carrier material is not considered essential to the present invention. Preferred carrier materials are alumina, silica and mixtures thereof. Suitable metallic components having hydrogenation activity are those selected from the group comprising the metals of Groups VI-B and VIII of the Periodic Table, as set forth in the Periodic Table of the Elements, E. H. Sargent and Company, 1964. Thus, the catalytic composites may comprise one or more metallic components from the group of molybdenum, tungsten, chromium, iron, cobalt, nickel, platinum, iridium, osmium, rhodium, ruthenium, and mixtures thereof. The concentration of the catalytically active metallic component, or components, is primarily dependent upon a particular metal as well as the physical and/or chemical characteristics of the particular hydrocarbon feedstock. For example, the metallic components of Group VI-B are generally present in an amount within the range of from about 1 to about 20 weight percent, the iron-group metals in an amount within the range of about 0.2 to about 10 weight percent, whereas the noble metals of Group VIII are preferably present in an amount within the range of from about 0.1 to about 5 weight percent, all of which are calculated as if these components existed within the catalytic composite in the elemental state. In addition, any catalyst employed commercially for hydrotreating middle distillate hydrocarbonaceous compounds to remove nitrogen and sulfur should normally function effectively in the hydrogenation zone of the present invention.

In the drawing, the process of the present invention is illustrated by means of a simplified flow diagram in which such details as pumps, instrumentation, heat-exchange and heat-recovery circuits, compressors and similar hardware have been deleted as being non-essential to an understanding of the techniques involved. The use of such miscellaneous appurtenances are well within the purview of one skilled in the art. With reference now to the drawing, an aqueous feedstream contaminated with trace quantities of hydrocarbonaceous compounds is introduced into the process via conduit 1 and subsequently passed to contacting zone 2. A recycle supercritical fluid which is derived in a manner hereinafter described is introduced via conduit 11 into contacting zone 2. In contacting zone 2 the aqueous stream and the supercritical fluid solvent are intimately admixed in order to extract trace quantities of hydrocarbonaceous compounds which had formerly been associated with the aqueous feedstream. After at least a portion of the contaminating hydrocarbonaceous compounds has been removed from the aqueous feedstream, a purified aqueous stream having a reduced concentration of hydrocarbonaceous compounds is removed from contacting zone 2 via conduit 3. A supercritical fluid stream which contains at least a portion of the hydrocarbonaceous contaminant contained in the aqueous feedstream is removed from contacting zone 2 via conduit 4 and introduced into separation zone 5. The operating conditions in separation zone 5 are selected to provide an environment whereby the solvent adopts a temperature and a pressure to provide subcritical conditions of the solvent. The temperature and pressure in separation zone 5 can be selected based on empirical determination to provide the most suitable conditions for the separation of the solvent and the hydrocarbonaceous components. After the fluid has become subcritical and loses its solvent properties for the hydrocarbonaceous extract, the solvent is removed from separation zone 5 via conduit 6 and is introduced into compressor 8. After compression the solvent is conducted from compressor 8 via conduit 9 into heat exchanger 10. The solvent is removed from heat exchanger 10 via conduit 11 and which solvent is now a supercritical fluid whic is recycled via conduit 11 to contacting zone 2 as hereinabove described. The contaminant hydrocarbonaceous compounds which had been separated from the subcritical solvent in separation zone 5 are removed via conduit 7 from separation zone 5 and introduced into hydrogenation zone 12. For purposes of ease of handling, the hydrocarbonaceous contaminant may be introduced into hydrogenation zone 12 by means of a solvent or carrier hydrocarbon. The hydrocarbonaceous contaminant which has been extracted from the original aqueous feedstream is hydrogenated in hydrogenation zone 12 in the presence of a hydrogenation catalyst maintained at hydrogenation conditions as described hereinabove. The resulting treated hydrocarbonaceous compounds are removed from hydrogenation zone 12 via conduit 13 and recovered.

The process of the present invention is further demonstrated by the following illustrative embodiment. This illustrative embodiment is however not presented to unduly limit the process of this invention, but to further illustrate the advantages of the hereinabove described embodiments. The following data were not obtained by the actual performance of the present invention, but are considered prospective and reasonably illustrative of the expected performance of the invention.

ILLUSTRATIVE EMBODIMENT

This illustrative embodiment describes the removal of poly chlorinated biphenel (PCB) from an aqueous stream which contains 500 weight PPM of PCB and the subsequent conversion of the recovered PCB by hydrotreating to produce innocuous hydrocarbonaceous compounds.

One pound of water containing 500 weight PPM of PCB is introduced into a multi-stage, counter-current contactor where the water is contacted with ten pounds of fluid carbon dioxide at supercritical conditions including a temperature of 104° F. (40° C.) and a pressure of 1200 psig. The residence time in the contactor for the water and the carbon dioxide is about 30 minutes. The resulting aqueous phase is found to contain no detectable quantity of PCB. The resulting carbon dioxide extraction solution containing PCB and maintained at supercritical conditions is contacted with ten pounds of diesel fuel and the resulting admixture is then sufficiently decreased in pressure to facilitate the complete precipitation of the PCB compounds from the carbon dioxide. The resulting precipitated PCB compounds then become dissolved in the diesel fuel which serves as a hydrocarbon solvent or carrier. The admixture of diesel fuel and PCB compounds is then charged to a hydrotreating zone containing a hydrotreating catalyst comprising alumina, cobalt and molybdenum and operated at hydrotreating conditions which include a pressure of about 1500 psig, a liquid hourly space velocity of about 1 $hr^{-1}$, a hydrogen circulation rate of about 3000 SCFB and a catalyst peak temperature of about 750° F. The hydrotreated hydrocarbon effluent is found to contain no detectable quantity of PCB.

The foregoing description, drawing and illustrative embodiment clearly illustrate the advantages emcompassed by the process of the present invention and the benefits to be afforded with the use thereof.

We claim as our invention:

1. A process for the removal of trace quantities of hydrocarbonaceous compounds from an aqueous stream which comprises the steps of:
  (a) contacting a solvent, which in the supercritical state is effective to dissolve said hydrocarbonaceous compounds from said aqueous stream, with said aqueous stream, for a time sufficient at supercritical solvent conditions to dissolve at least a portion of said hydrocarbonaceous compounds and to produce an aqueous stream having a reduced hydrocarbonaceous compound concentration;
  (b) separating said hydrocarbonaceous compounds from said solvent at subcritical conditions; and
  (c) recovering said hydrocarbonaceous compounds.

2. The process of claim 1 wherein said solvent is selected from the group consisting of carbon dioxide, saturated and unsaturated hydrocarbons containing up to about 5 carbon atoms, nitrous oxides, saturated and unsaturated halogenated hydrocarbons containing up to about 3 carbon atoms and mixtures thereof.

3. The process of claim 1 wherein said separation of step (b) is effected by adjusting the temperature or pressure of said solvent.

4. The process of claim 1 wherein said trace quantities of hydrocarbonaceous compounds are present in said aqueous stream in an amount from about 1 to about 10,000 PPM.

5. The process of claim 1 wherein said trace quantities of hydrocarbonaceous compounds comprise halogenated hydrocarbons.

6. The process of claim 1 wherein said trace quantities of hydrocarbonaceous compounds comprise sulfur, oxygen, metal, or nitrogen components.

7. The process of claim 1 wherein the contact time in step (a) is from about 0.1 to about 100 minutes.

8. The process of claim 1 wherein said aqueous stream having a reduced hydrocarbonaceous compound concentration is essentially hydrocarbon-free.

9. A process for the removal of trace quantities of hydrocarbonaceous compounds having obnoxious characteristics from an aqueous stream which comprises the steps of:
  (a) contacting a solvent, which in the supercritical state is effective to dissolve said hydrocarbonaceous compounds from said aqueous stream, with said aqueous stream, for a time sufficient at supercritical solvent conditions to dissolve at least a portion of said hydrocarbonaceous compounds and to produce an aqueous stream having a reduced hydrocarbonaceous compound concentration;
  (b) separating said hydrocarbonaceous compounds from said solvent at subcritical conditions; and
  (c) hydrotreating said hydrocarbonaceous compounds recovered from step (b) whereby the obnoxious characteristics of said hydrocarbonaceous compounds are reduced.

10. The process of claim 9 wherein said aqueous stream having a reduced hydrocarbonaceous compound concentration is essentially hydrocarbon-free.

11. The process of claim 9 wherein said solvent is selected from the group consisting of carbon dioxide, saturated and unsaturated hydrocarbons containing up to about 5 carbon atoms, nitrous oxides, saturated and unsaturated halogenated hydrocarbons containing up to about 3 carbon atoms and mixtures thereof.

12. The process of claim 9 wherein said separation of step (b) is effected by adjusting the temperature or pressure of said solvent.

13. The process of claim 9 wherein said trace quantities of hydrocarbonaceous compounds are present in said aqueous stream in an amount from about 1 to about 10,000 PPM.

14. The process of claim 9 wherein said trace quantities of hydrocarbonaceous compounds comprise halogenated hydrocarbons 15. The process of claim 9 wherein said trace quantities of hydrocarbonaceous compounds comprise sulfur, oxygen, metal, or nitrogen components.

16. The process of claim 9 wherein the contact time in step (a) is from about 0.1 to about 100 minutes.

17. The process of claim 9 wherein said hydrotreating in step (c) is conducted in the presence of a catalyst comprising alumina, cobalt and molybdenum.

18. The process of claim 9 wherein said hydrotreating in step (c) is conducted at conditions which include a pressure from about 300 psig to about 2000 psig, a maximum catalyst temperature from about 400° F. to about 850° F., a liquid hourly space velocity from about 0.2 hr$^{-1}$ to about 10 hr$^{-1}$ and a hydrogen circulation rate from about 200 SCFB to about 10,000 SCFB.

19. The process of claim 9 wherein said hydrotreating in step (c) is conducted by introducing said hydrocarbonaceous compounds recovered from step (b) in admixture with a carrier hydrocarbon.

20. The process of claim 19 wherein said carrier hydrocarbon is diesel fuel.

* * * * *